United States Patent
Katoh et al.

(10) Patent No.: US 10,654,477 B2
(45) Date of Patent: May 19, 2020

(54) VEHICLE CONTROL DEVICE

(71) Applicant: Hitachi Automotive Systems, Ltd., Hitachinaka-shi, Ibaraki (JP)

(72) Inventors: Shunsuke Katoh, Ibaraki (JP); Kiyoshi Yorozuya, Ibaraki (JP); Shigenori Hayase, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/761,193

(22) PCT Filed: Sep. 20, 2016

(86) PCT No.: PCT/JP2016/077618
§ 371 (c)(1),
(2) Date: Mar. 19, 2018

(87) PCT Pub. No.: WO2017/064981
PCT Pub. Date: Apr. 20, 2017

(65) Prior Publication Data
US 2018/0257648 A1    Sep. 13, 2018

(30) Foreign Application Priority Data
Oct. 15, 2015  (JP) .................................. 2015-203341

(51) Int. Cl.
*B60W 30/12*    (2020.01)
*B62D 1/28*     (2006.01)
(Continued)

(52) U.S. Cl.
CPC ............ *B60W 30/12* (2013.01); *B60W 10/04* (2013.01); *B60W 10/20* (2013.01); *B60W 30/09* (2013.01);
(Continued)

(58) Field of Classification Search
None
See application file for complete search history.

(56) References Cited

U.S. PATENT DOCUMENTS 7,634,339 B2 * 12/2009 Kudo ..................... G08G 1/166
                                                      340/435
7,783,426 B2 *  8/2010 Kato ..................... B60W 40/04
                                                      180/167
(Continued)

FOREIGN PATENT DOCUMENTS

JP     2001-022444 A    1/2001
JP     2014-058229 A    4/2004
(Continued)

OTHER PUBLICATIONS

International Search Report with English translation and Written Opinion issued in corresponding application No. PCT/JP2016/077618 dated Dec. 27, 2016.
(Continued)

*Primary Examiner* — Dale W Hilgendorf
*Assistant Examiner* — Alexander C. Bost
(74) *Attorney, Agent, or Firm* — Foley & Lardner LLP

(57) ABSTRACT

Provided is a feature such that the opportunity to cancel travel control can be reduced by seamlessly switching between travel modes in combination with a plurality of functions. A travel control device has: a first mode which causes a vehicle to travel according to the control target set on the basis of an object outside the vehicle; and a second mode which causes the vehicle to travel according to the control target set irrespective of an object outside the vehicle. If it is impossible to set the control target on the basis of the object outside the vehicle during traveling in the first mode, the travel mode is shifted to the second mode. If it is possible to set the control target on the basis of the
(Continued)

object outside the vehicle during traveling in the second mode, the travel mode is shifted to the first mode.

10 Claims, 17 Drawing Sheets

(51) Int. Cl.
  *B62D 15/02* (2006.01)
  *B60W 10/04* (2006.01)
  *B60W 10/20* (2006.01)
  *B60W 30/09* (2012.01)
  *B60W 30/14* (2006.01)
  *B60W 30/165* (2020.01)
  *B60W 30/182* (2020.01)
  *B60W 40/105* (2012.01)
  *G05D 1/02* (2020.01)
  *B60W 50/00* (2006.01)

(52) U.S. Cl.
  CPC ........ *B60W 30/143* (2013.01); *B60W 30/165* (2013.01); *B60W 30/182* (2013.01); *B60W 40/105* (2013.01); *B62D 1/28* (2013.01); *B62D 15/025* (2013.01); *B62D 15/026* (2013.01); *G05D 1/0251* (2013.01); *G05D 1/0257* (2013.01); *B60W 2050/0091* (2013.01); *B60W 2400/00* (2013.01); *B60W 2420/42* (2013.01); *B60W 2420/52* (2013.01); *B60W 2520/10* (2013.01); *B60W 2540/18* (2013.01); *B60W 2550/10* (2013.01); *B60W 2550/14* (2013.01); *B60W 2550/30* (2013.01); *B60W 2550/306* (2013.01); *B60W 2710/207* (2013.01); *B60W 2720/10* (2013.01); *B60W 2750/306* (2013.01); *G05D 2201/0213* (2013.01)

(56) References Cited

U.S. PATENT DOCUMENTS 8,874,267 B1 * 10/2014 Dolgov .................... G08G 1/16
                                                         700/255
8,948,954 B1 * 2/2015 Ferguson .............. B60W 30/12
                                                         701/23
2009/0157286 A1 6/2009 Saito et al.

FOREIGN PATENT DOCUMENTS

JP  2004-206275 A  7/2004
JP  2009-003795 A  1/2009

OTHER PUBLICATIONS

Notification of Reasons for Refusal dated Mar. 12, 2019 in the corresponding Japanese Patent Application No. 2017-545129 with its English machine translation.
Decision of Refusal received in corresponding Japanese Patent Application No. 2017-545129 dated Oct. 15, 2019 with English translation.

* cited by examiner

SCENE IN WHICH PRECEDING VEHICLE FOLLOW-UP TRAVEL MODE IS PREFERRED TO LANE MARKING FOLLOW-UP CONTROL MODE

SCENE IN WHICH TRANSITION TO PRECEDING
VEHICLE FOLLOW-UP TRAVEL MODE IS SUPPRESSED

SCENE IN WHICH TRANSITION TO PRECEDING VEHICLE
FOLLOW-UP TRAVEL MODE IS SUPPRESSED

VEHICLE CONTROL DEVICE

TECHNICAL FIELD

The present invention relates to a travel control device that performs control to travel along lane markings of a traveling lane or to travel so as to follow a preceding vehicle.

BACKGROUND ART

In a travel control device that performs control to travel along lane markings of a traveling lane, a technique for continuing a travel control even at a point where the lane markings are not properly recognized is disclosed in JP 2004-206275 A (PTL 1). In PTL 1, when a white line cannot be properly recognized during execution of a white line follow-up control, it is determined whether the follow-up of a preceding vehicle is possible. If the follow-up of the preceding vehicle is possible, a preceding vehicle follow-up control is executed in place of the white line follow-up control.

CITATION LIST

Patent Literature

PTL 1: JP 2004-206275 A

SUMMARY OF INVENTION

Technical Problem

In PTL 1, when it is determined that a white line follow-up control and a preceding vehicle follow-up control are impossible, a travel control is canceled. However, there is a problem that when a preceding vehicle does not exist and a state of a white line is not good, the cancellation of the travel control frequently occurs.

Therefore, an object of the present invention is to provide a technique that can continue a travel control by combining a plurality of functions even if a preceding vehicle does not exist and a state of a white line is not good.

Solution to Problem

To solve the above problem, in a representative travel control device of the present invention includes: a first mode which causes a host vehicle to travel according to a control target set on the basis of an object outside the host vehicle; and a second mode which causes the host vehicle to travel according to a control target set irrespective of an object outside the host vehicle, in which when it is possible to set the control target on the basis of the object outside the host vehicle during traveling in the second mode, a travel mode is shifted to the first mode.

Advantageous Effects of Invention

According to the present invention, a travel control can be continued by combining a plurality of functions and switching a travel mode seamlessly even if a preceding vehicle does not exist and a state of a white line is not good. The objects, configurations, and effects other than those described above will become apparent from the following description of embodiments.

DESCRIPTION OF EMBODIMENT

Figure 1:
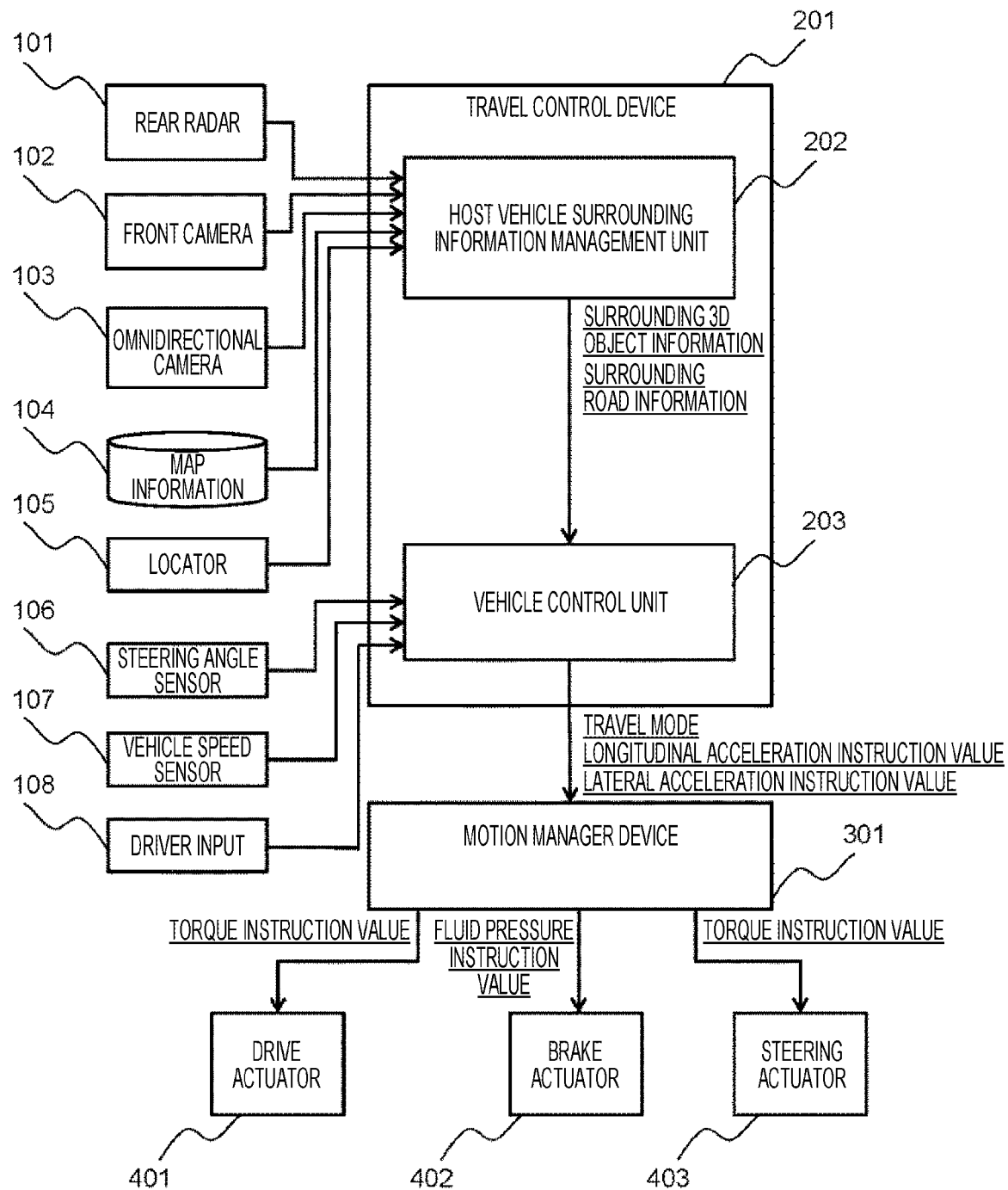
FIG. 1 is a diagram illustrating a configuration example of an in-vehicle system using a travel control device according to the present invention.

Hereinafter, an embodiment of the present invention will be described.

A travel control device according to the present embodiment has a first mode which causes a host vehicle to travel according to a control target set on the basis of an object outside the host vehicle, and a second mode which causes a host vehicle to travel according to a control target set irrespective of an object outside the host vehicle. Then, if it is impossible to set the control target on the basis of the object outside the host vehicle during traveling in the first mode, the travel mode is shifted to the second mode. In addition, if it is possible to set the control target on the basis of the object outside the host vehicle during traveling in the second mode, the travel mode is shifted to the first mode.

For example, the first mode has a lane marking follow-up travel mode which performs traveling along lane markings that divide a traveling lane of the host vehicle, and a preceding vehicle follow-up travel mode which causes the host vehicle to travel following the preceding vehicle traveling ahead of the host vehicle. The second mode has a vehicle speed control mode such as a cruise control (CC) with the host vehicle speed as the control target. In the present embodiment, a steering control and a vehicle speed control are performed in the lane marking follow-up travel mode and the preceding vehicle follow-up travel mode, and a vehicle speed control is performed in the vehicle speed control mode without performing a steering angle control. That is, the control target set on the basis of the object outside the host vehicle in the first mode is the lane markings in the lane marking follow-up travel mode and the preceding vehicle in the preceding vehicle follow-up travel mode, and the control target set irrespective of the object outside the host vehicle in the second mode is the host vehicle speed in the vehicle speed control mode.

Then, if traveling along the lane markings is difficult from a state in which the vehicle is traveling in the traveling lane in the lane marking follow-up travel mode that is the first mode, the mode is switched to the vehicle speed control mode that is the second mode to continue the vehicle speed control of the host vehicle when the vehicle satisfying a follow-up travel enabling condition does not exist in front of the host vehicle. In addition, if the vehicle satisfying the follow-up travel enabling condition exists in front of the host vehicle, the mode is switched to the preceding vehicle follow-up travel mode that is the first mode, so as to shift to the preceding vehicle follow-up control.

In addition, if it is possible to set the control target on the basis of the object outside the host vehicle during traveling in the second mode, that is, if traveling in the lane marking follow-up travel mode or the preceding vehicle follow-up travel mode that is the first mode is possible during traveling in the vehicle speed control mode that is the second mode, the travel mode is shifted to the first mode. For example, when the lane marking or the preceding vehicle is detected while the vehicle speed control is continued, the lane marking follow-up travel mode or the preceding vehicle follow-up travel mode is restored.

The travel state may be shifted in the first mode according to the state of the control target. For example, if traveling along the lane markings is difficult from a state in which the vehicle is traveling in the traveling lane in the lane marking follow-up travel mode that is the first mode, the travel mode may be switched to the preceding vehicle follow-up travel mode that is the same first mode when the vehicle satisfying the follow-up travel enabling condition exists in front of the host vehicle.

Then, when the vehicle comes to a state in which traveling is possible in the lane marking follow-up travel mode that is the first mode, from a state in which the vehicle is following the preceding vehicle traveling ahead of the host vehicle in the preceding vehicle follow-up travel mode that is the same first mode, the travel mode may be shifted from the preceding vehicle follow-up travel mode to the lane marking follow-up travel mode.

Specific examples of the present invention will be described with reference to the drawings.

Example 1

A travel control device 201 of FIG. 1 includes a host vehicle surrounding information management unit 202 that manages external world information around a host vehicle, and a vehicle control unit 203 that controls the host vehicle on the basis of the external world information.

A rear radar 101, a front camera 102, and an omnidirectional camera 103 are used to acquire the external world information around the host vehicle. Map information 104 and a locator 105 are used to acquire road information and a position of the host vehicle. The host vehicle surrounding information management unit 202 outputs surrounding 3D object information or surrounding road information to the vehicle control unit 203 on the basis of data input from sensors 101 to 107.

A steering angle sensor 106 is used to acquire a steering wheel angle. A vehicle speed sensor 107 is used to acquire a speed of the host vehicle. A driver input 108 is used to acquire information input by a driver. A motion manager device 301 controls a drive actuator 401, a brake actuator 402, and a steering actuator 403 on the basis of a manual operation when a travel mode output by the travel control device 201 is an automatic driving cancellation mode, and on the basis of a longitudinal acceleration instruction value and a lateral acceleration instruction value when a travel mode is not the automatic driving cancellation mode.

Figure 2:
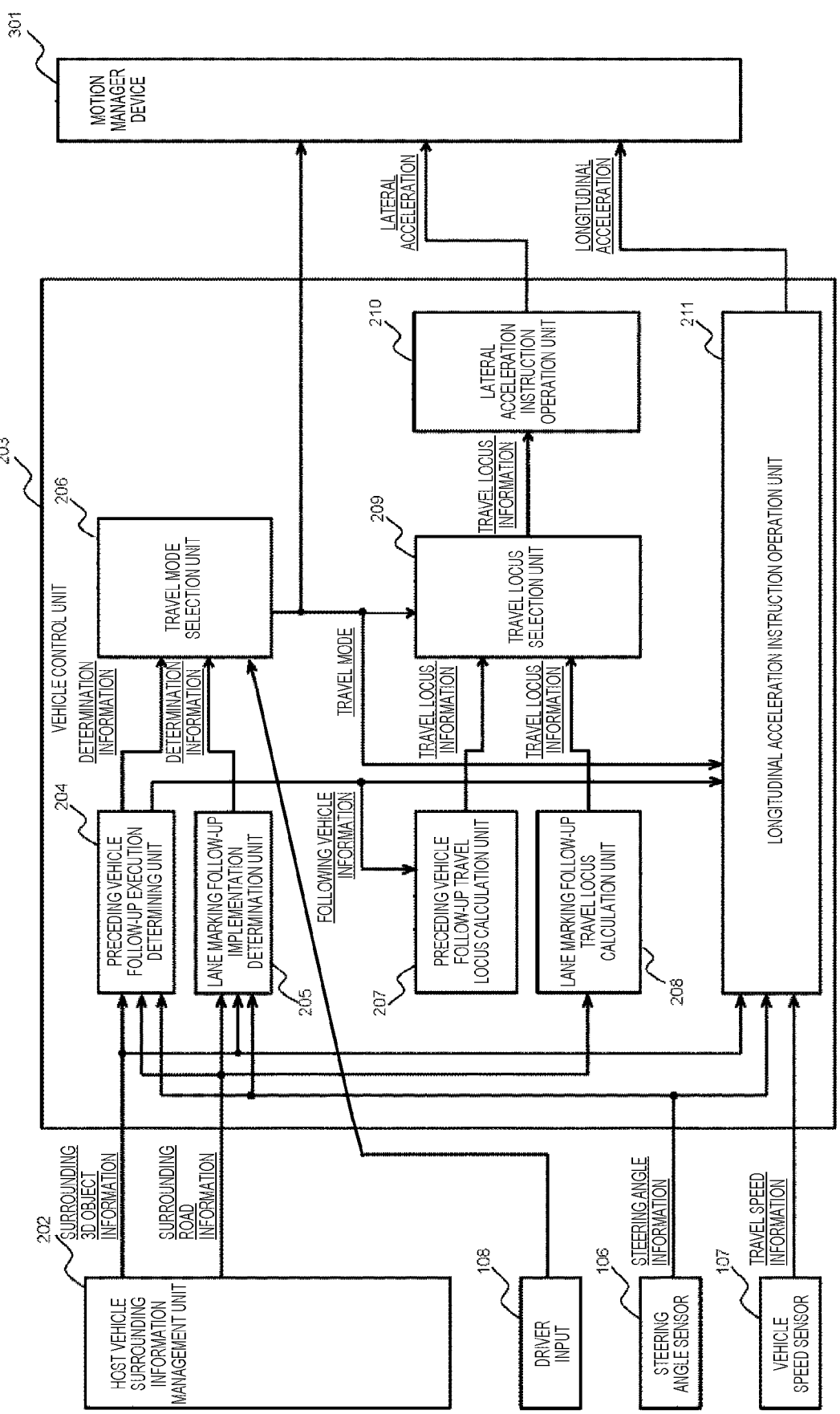
FIG. 2 is a diagram illustrating a configuration example of the in-vehicle system using the travel control device according to the present invention.

As illustrated in FIG. 2, the vehicle control unit 203 includes: a preceding vehicle follow-up execution determination unit 204 that makes a determination to follow the preceding vehicle on the basis of the surrounding 3D object information and the surrounding road information input from the host vehicle surrounding information management unit 202 and steering angle information acquired by the steering angle sensor 106; a lane marking follow-up implementation determination unit 205 that makes a determination to follow the lane marking; a travel mode selection unit 206 that selects a travel mode on the basis of results of the preceding vehicle follow-up execution determination unit 204 and the lane marking follow-up implementation determination unit 205 and driver input information acquired by the driver input 108; a preceding vehicle follow-up travel locus calculation unit 207 that calculates a travel locus on the basis of the preceding vehicle information determined by the preceding vehicle follow-up execution determination unit 204; a lane marking follow-up travel locus calculation unit 208 that calculates a travel locus on the basis of the surrounding road information input from the host vehicle surrounding information management unit 202; a travel locus selection unit 209 that selects a travel locus from travel locus information calculated by the preceding vehicle follow-up travel locus calculation unit 207 on the basis of the travel mode selected by the travel mode selection unit 206 and the travel locus information calculated by the lane marking follow-up travel locus calculation unit 208; a lateral acceleration instruction operation unit 210 that calculates a lateral acceleration instruction value on the basis of the travel locus selected by the travel locus selection unit 209; and a longitudinal acceleration instruction operation unit 211 that calculates a longitudinal acceleration instruction value on the basis of the surrounding 3D object information input from the host vehicle surrounding information management unit 202, the travel mode selected by the travel mode selection unit 206, preceding vehicle information determined by the preceding vehicle follow-up execution determination unit 204, the steering angle information acquired by the steering angle sensor 106, and the vehicle speed information acquired by the vehicle speed sensor 107.

Figure 3:
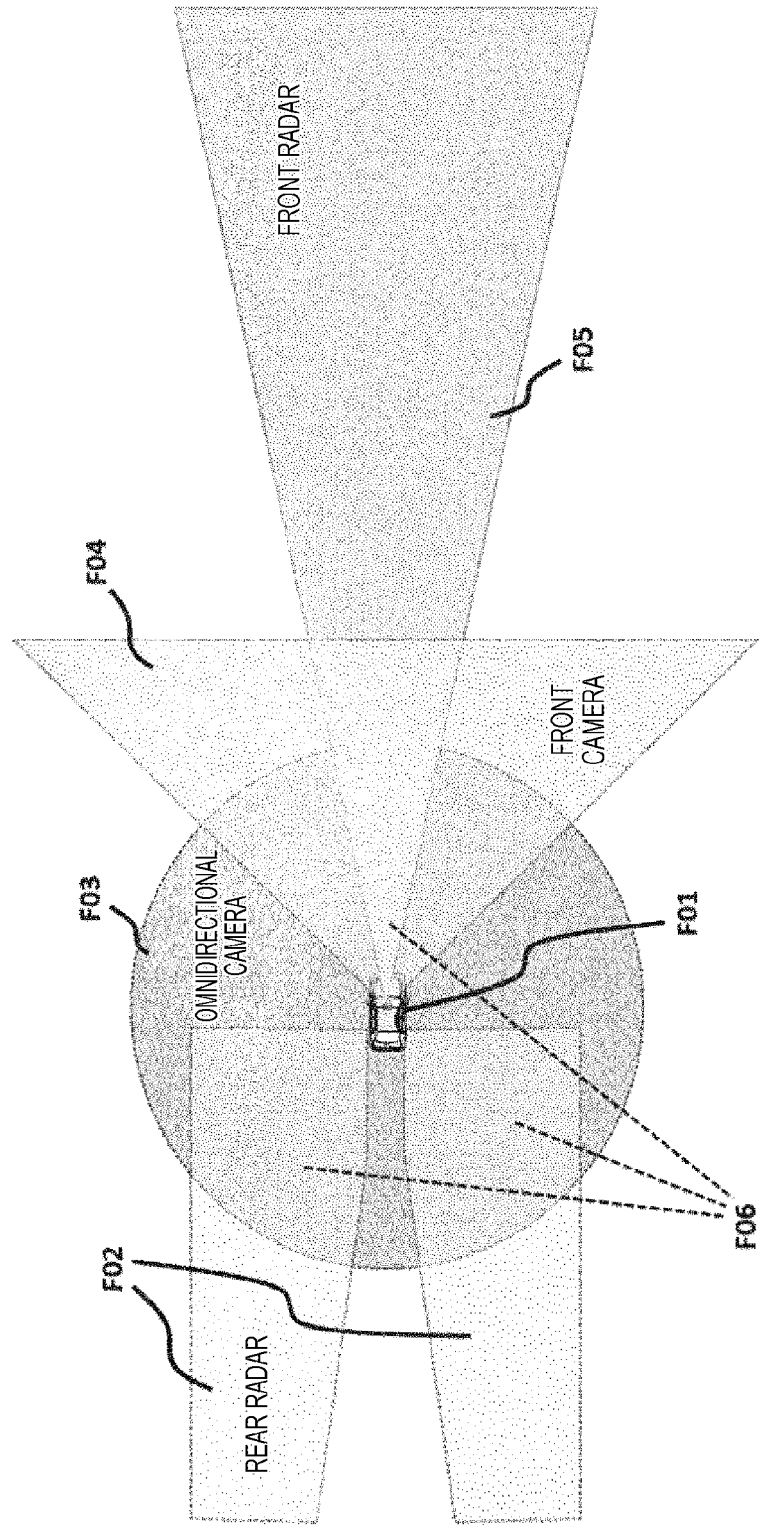
FIG. 3 is a diagram illustrating an example of a recognition range of an external world according to the present invention.

FIG. 3 illustrates an example of a recognition range of the external world in the present embodiment. A host vehicle F01 is equipped with a rear radar F02, an omnidirectional camera F03, a front camera F04, and a front radar F05 and is configured as a detection system capable of detecting information on the entire surroundings of the host vehicle.

Figure 4:
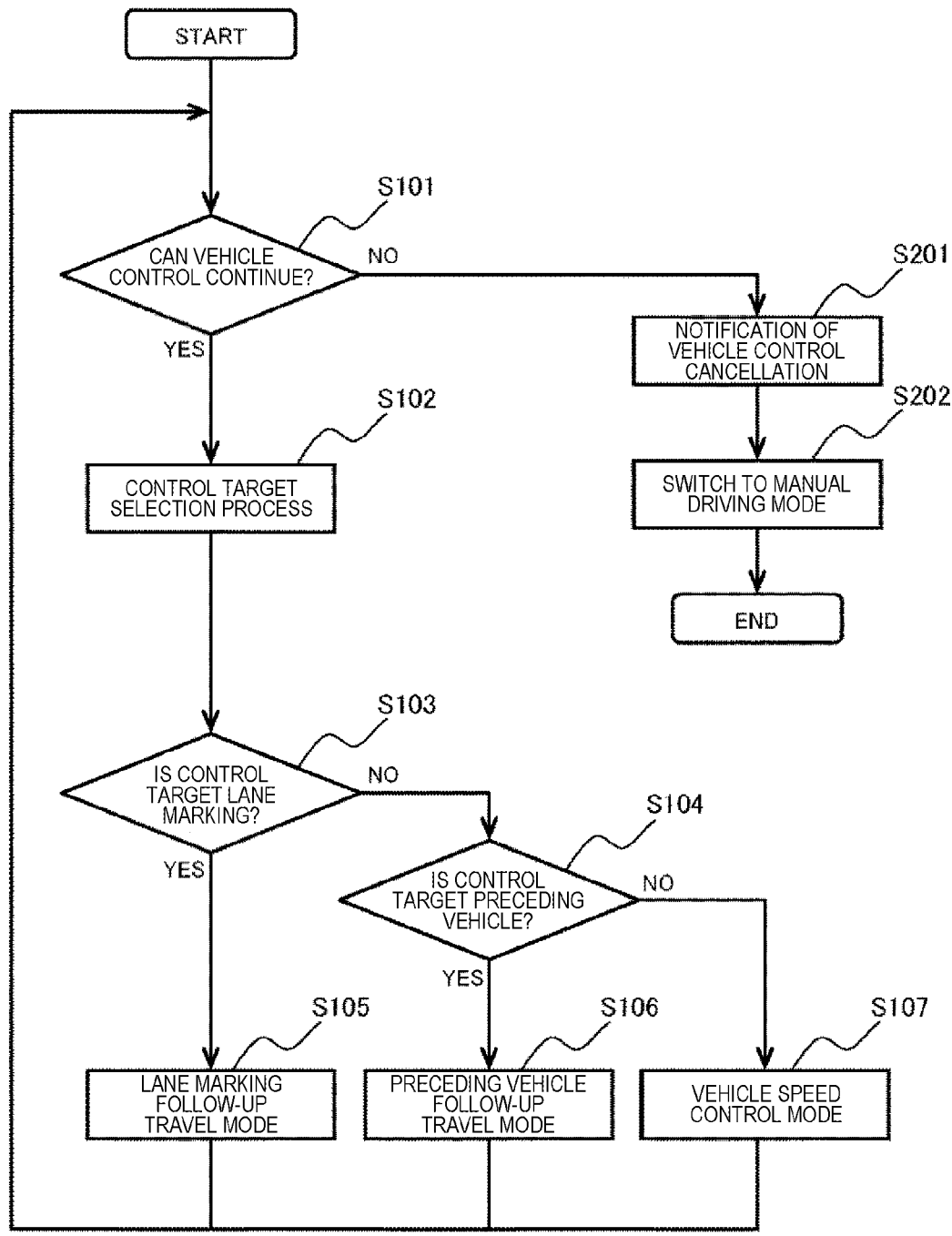
FIG. 4 is a processing flowchart of an embodiment of the present invention.

FIG. 4 is a flowchart illustrating an embodiment of a travel mode selection process procedure of the travel mode selection unit 206 when the present invention is applied to the travel control.

Here, the travel mode is selected according to a control object. Specifically, one vehicle speed control mode is selected from among the lane marking follow-up travel mode which performs traveling along the lane markings that divide the traveling lane of the host vehicle, the preceding vehicle follow-up travel mode which causes the host vehicle to travel following the preceding vehicle traveling ahead of the host vehicle, and the CC with a host vehicle speed as the control target. The lane marking follow-up travel mode and the preceding vehicle follow-up travel mode are the first mode which causes the host vehicle to travel according to the control target set on the basis of the object outside the host vehicle, and the vehicle speed control mode is the second mode which causes the host vehicle to travel according to the control target set irrespective of the object outside the host vehicle. The operation based on the flowchart is as follows.

START: A procedure of selecting a travel mode is started by a start instruction of automatic driving by a driver's intention.

Step S101: If a cancellation of a vehicle control due to the driver's intention or a vehicle control cancellation factor due to fail-safe occurs, the process proceeds to step S201. Otherwise, the process proceeds to step S102. A vehicle control by the driver's intention includes an explicit automatic driving cancellation by a switch operation of the driver, and an implicit automatic driving cancellation by an operation of a brake or a steering wheel.

Step S102: The control target is selected, and the process proceeds to step S103.

Step S103: If the control target is set as the lane marking, the process proceeds to step S105. If NO, the process proceeds to step S104.

Step S104: If the control target is set as the preceding vehicle, the process proceeds to step S106. If NO, the process proceeds to step S107.

Step S105: The travel mode is set to the lane marking follow-up travel mode, the instruction value by the lane marking follow-up control is calculated, and the process returns to the step S101.

Step S106: The travel mode is set to the preceding vehicle follow-up travel mode, the instruction value by the preceding vehicle follow-up control is calculated, and the process returns to the step S101.

Step S107: The travel mode is set to the vehicle speed control mode, the instruction value by the vehicle speed control is calculated, and the process returns to the step S101.

Step S201: The driver is notified that the vehicle control is canceled, and the process proceeds to step S202.

Step S202: The automatic driving cancellation mode is entered, the vehicle control is canceled, and the process is ended. Thereafter, the automatic driving cancellation mode is maintained until there is an instruction to start automatic driving due to the driver's intention.

Figure 5:
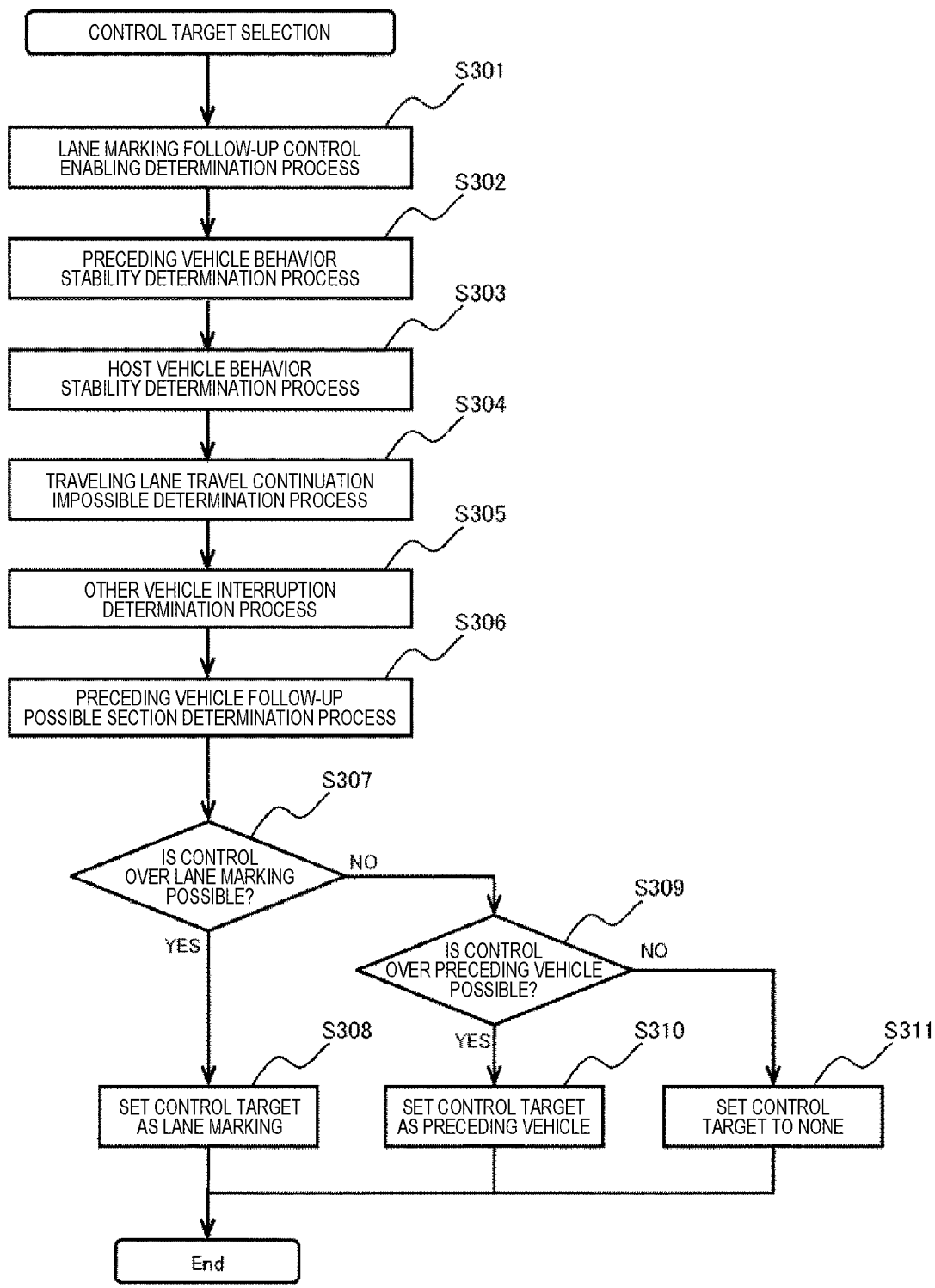
FIG. 5 is a processing flowchart of the embodiment of the present invention.

FIG. 5 is a flowchart of the step S102 (control target selection process). The operation based on the flowchart is as follows.

Step S301: It is determined whether a control over the lane marking is possible, and the process proceeds to step S302.

Step S302: A behavior stability of the preceding vehicle is determined, and the process proceeds to step S303.

Step S303: A behavior stability of the host vehicle is determined, and the process proceeds to step S304.

Step S304: It is determined whether the traveling lane of the host vehicle is a traveling lane along which the host vehicle can continue traveling, and the process proceeds to step S305.

Step S305: It is determined whether there is a possibility that other vehicle can interrupt on the travel locus of the host vehicle, and the process proceeds to step S306.

Step S306: It is determined whether a travel section is a section where the preceding vehicle can be followed, and the process proceeds to step S307.

Step S307: If the follow-up control over the lane marking is possible, the process proceeds to step S308. If NO, the process proceeds to step S309.

Step S308: The control target is set as the lane marking, and the process is ended.

Step S309: if the control over the preceding vehicle is possible, the process proceeds to step S310.

If NO, the process proceeds to step S311.

Step S310: The control target is set as the preceding vehicle, and the process is ended.

Step S311: The control target is set to none, and the process is ended.

Figure 6:
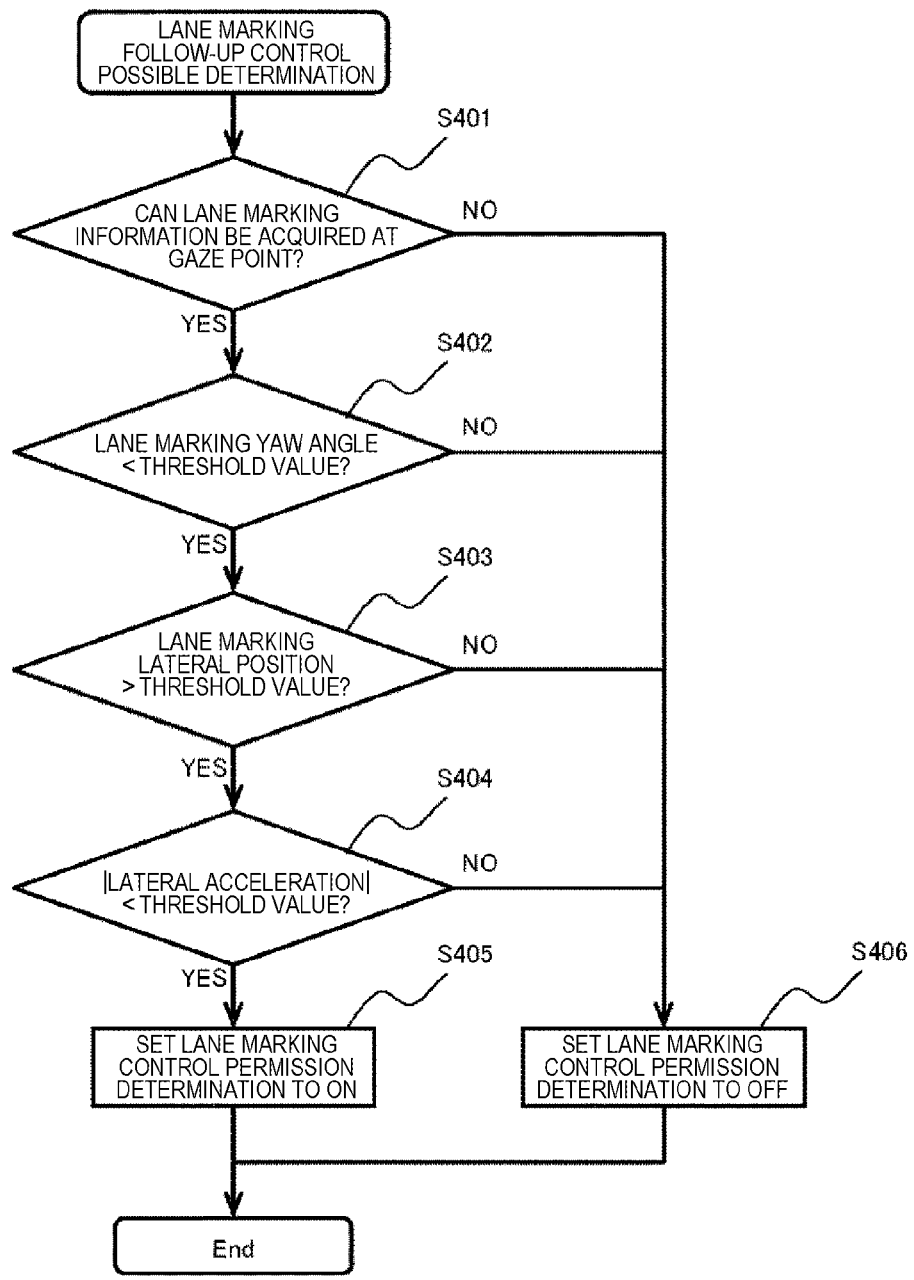
FIG. 6 is a processing flowchart of the embodiment of the present invention.

FIG. 6 is a flowchart of the step S301 (lane marking follow-up control enabling determination process). The operation based on the flowchart is as follows.

Step S401: If lane marking information at a front gaze point can be acquired, the process proceeds step S402. If NO, the process proceeds to step S406.

Step S402: If a travel direction angle of the host vehicle with respect to the lane marking (lane marking yaw angle) is smaller than a threshold value, the process proceeds to step S403. If NO, the process proceeds to the step S406.

Step S403: If a distance from a vehicle center to left and right lane markings (lane marking lateral position) is larger than the threshold value, the process proceeds to step S404. If NO, the process proceeds to the step S406.

Step S404: If an absolute value of lateral acceleration of the host vehicle is smaller than the threshold value, the process proceeds to step S405. If NO, the process proceeds to the step S406.

Step S405: A lane marking control permission determination is set to ON, and the process is ended.

Step S406: The lane marking control permission determination is set to OFF, and the process is ended.

Figure 7:
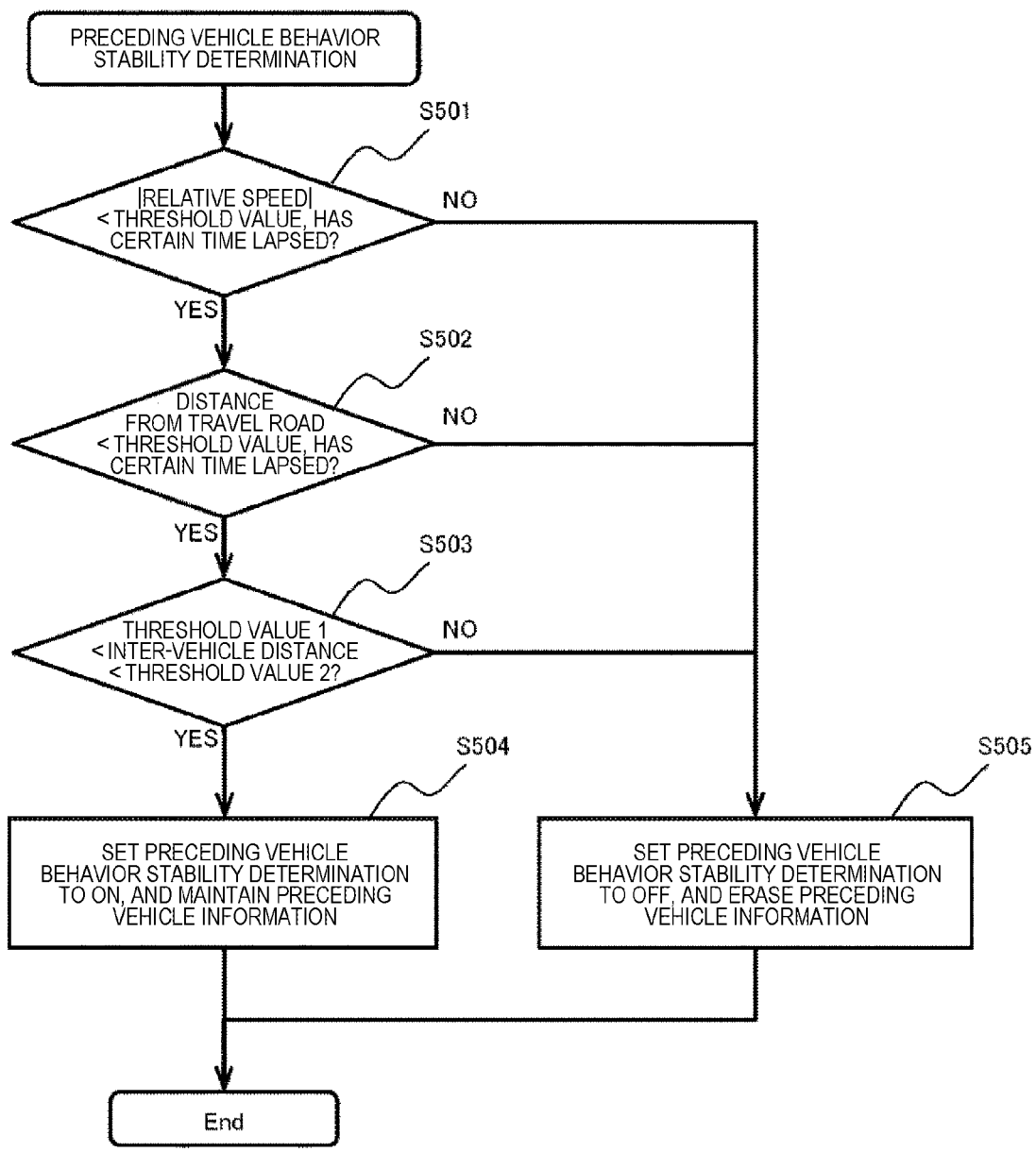
FIG. 7 is a processing flowchart of the embodiment of the present invention.

FIG. 7 is a flowchart of the step S302 (preceding vehicle behavior stability determination process). The operation based on the flowchart is as follows.

Step S501: If an integral value of the absolute value of a longitudinal relative speed $V_{relx}$ and the absolute value of a lateral relative speed $V_{rely}$ of the preceding vehicle within a certain period of time is smaller than threshold values $thr_1$ and $thr_2$, the process proceeds to step S502. If NO, the process proceeds to step S505.

$$\int_t^{t+\alpha} |V_{relx}| dt < thr_1$$

$$\int_t^{t+\beta} |V_{rely}| dt < thr_2 \qquad \text{[Mathematical Formula 1]}$$

Step S502: If an inter-vehicle distance d from a center of an estimated travel path of the host vehicle to the preceding vehicle is smaller than a threshold value thr3, the process proceeds to step S503. If NO, the process proceeds to the step S505. The estimated travel path of the host vehicle is calculated by the following equation. Here, a yaw rate is $\gamma$, a speed of the host vehicle is V, a stability factor is A, a wheel base is 1, a front wheel steering angle is $\delta_w$, a steering wheel angle is $\delta_h$, and a steering gear ratio is $n_g$.

$$\gamma = \frac{1}{1+A} \frac{V}{l} \delta_w \qquad \text{[Mathematical Formula 2]}$$

-continued $$\delta_w = \frac{1}{n_g} \delta_h$$

Step S503: If the inter-vehicle distance d is larger than a threshold value $thr_4$ and smaller than a threshold value $thr_5$, the process proceeds to step S504. If NO, the process proceeds to the step S505.

[Mathematical Formula 3]

$$0 < thr_4 < d < thr_5$$

Step S504: The preceding vehicle behavior stability determination is set to ON, current preceding vehicle information is stored, and the process is ended.

Step S505: The preceding vehicle behavior stability determination is set to OFF, the stored preceding vehicle information is erased, and the process is ended.

Figure 8:
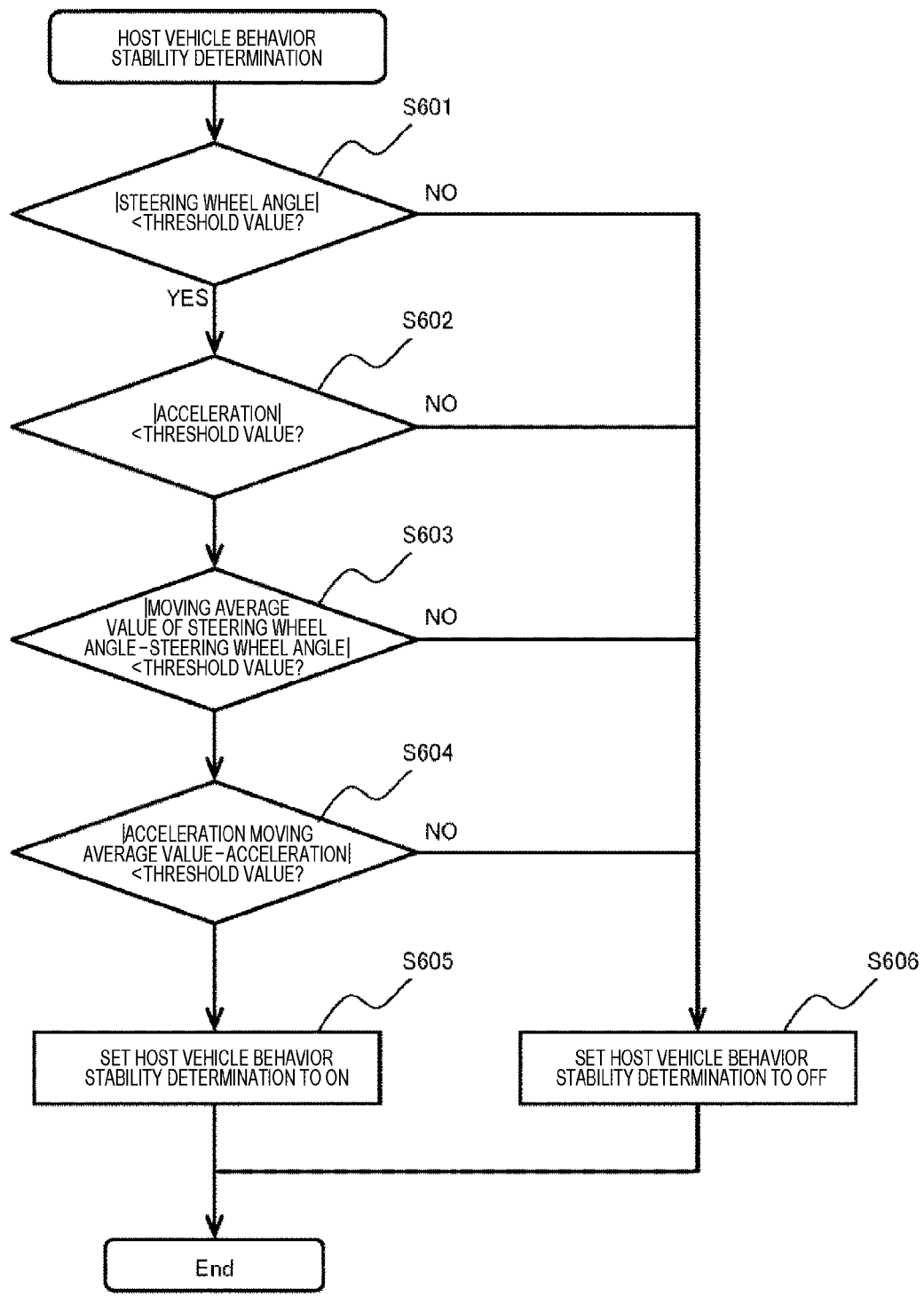
FIG. 8 is a processing flowchart of the embodiment of the present invention.

FIG. 8 is a flowchart of the step S303 (host vehicle behavior stability determination process). The operation based on the flowchart is as follows.

Step S601: If an absolute value of a steering wheel angle $\delta_h$ is smaller than a threshold value $thr_6$, the process proceeds to step S602. If NO, the process proceeds to step S606.

Step S602: If the absolute values of longitudinal acceleration $a_x$ and lateral acceleration $a_y$ are smaller than threshold values $thr_7$ and $thr_8$, respectively, the process proceeds to step S603. If NO, the process proceeds to the step S606.

Step S603: If a difference between a moving average value $\delta_{h_{ave}}$ of the steering wheel angle and a steering wheel angle $\delta_{h_i}$ (i=0, 1, 2, ..., n) in each processing cycle is smaller than a threshold value $thr_9$, the process proceeds to step S604. If NO, the process proceeds to the step S606.

[Mathematical Formula 4]

$$|\delta_{h_{ave}} = \delta_{h_i}| < thr_9$$

$$\delta_{h_{ave}} = \frac{1}{n} \sum_{i=0}^{n} \delta_{h_i}$$

Step S604: Difference between a moving average value $a_{x_{ave}}$ of the longitudinal acceleration and a lateral acceleration $a_{y_{ave}}$ and longitudinal acceleration $a_{x_i}$ and lateral acceleration $a_{y_i}$ (i=0, 1, 2, ..., n) in each processing cycle are respectively smaller than threshold values $thr_{10}$ and $thr_{11}$, the process proceeds to step S605. If NO, the process proceeds to the step S606.

[Mathematical Formula 5]

$$|a_{x_{ave}} - a_{x_i}| < thr_{10}$$

$$a_{x_{ave}} = \frac{1}{n} \sum_{i=0}^{n} a_{x_i}$$

$$|a_{y_{ave}} - a_{y_i}| < thr_{11}$$

$$a_{y_{ave}} = \frac{1}{n} \sum_{i=0}^{n} a_{y_i}$$

Step S605: The host vehicle behavior stability determination is set to ON, and the process is ended.

Step S606: The host vehicle behavior stability determination is set to OFF, and the process is ended.

Figure 10:
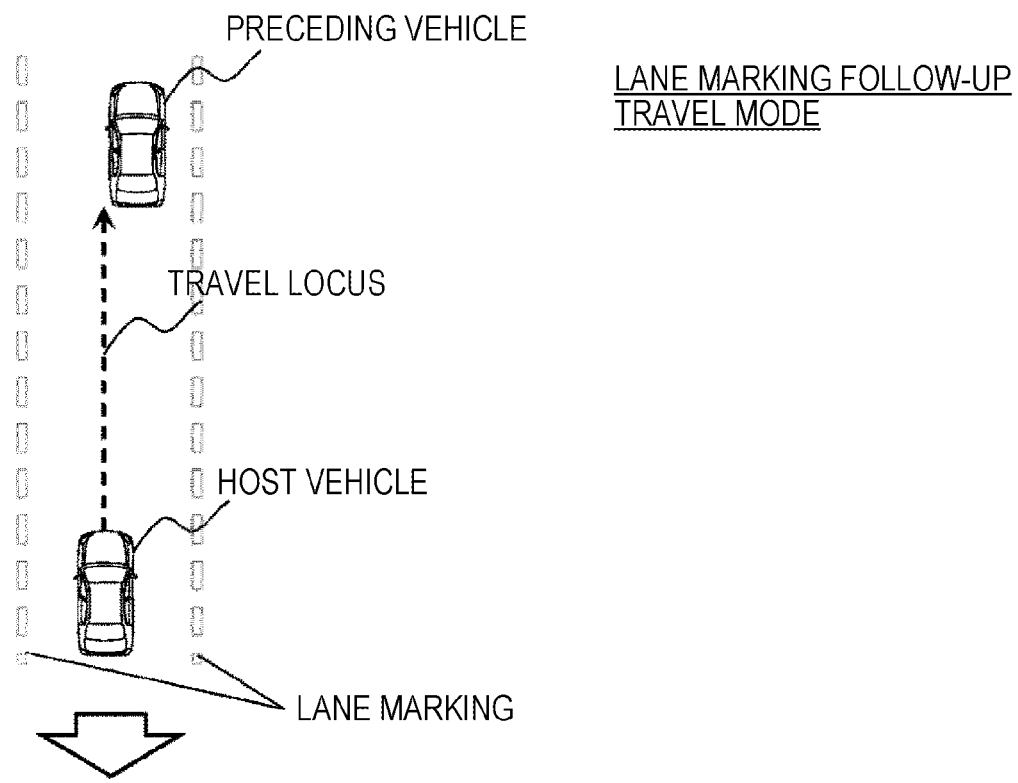
FIG. 10 is a diagram describing Example 1 of the embodiment of the present invention.
Figure 10:
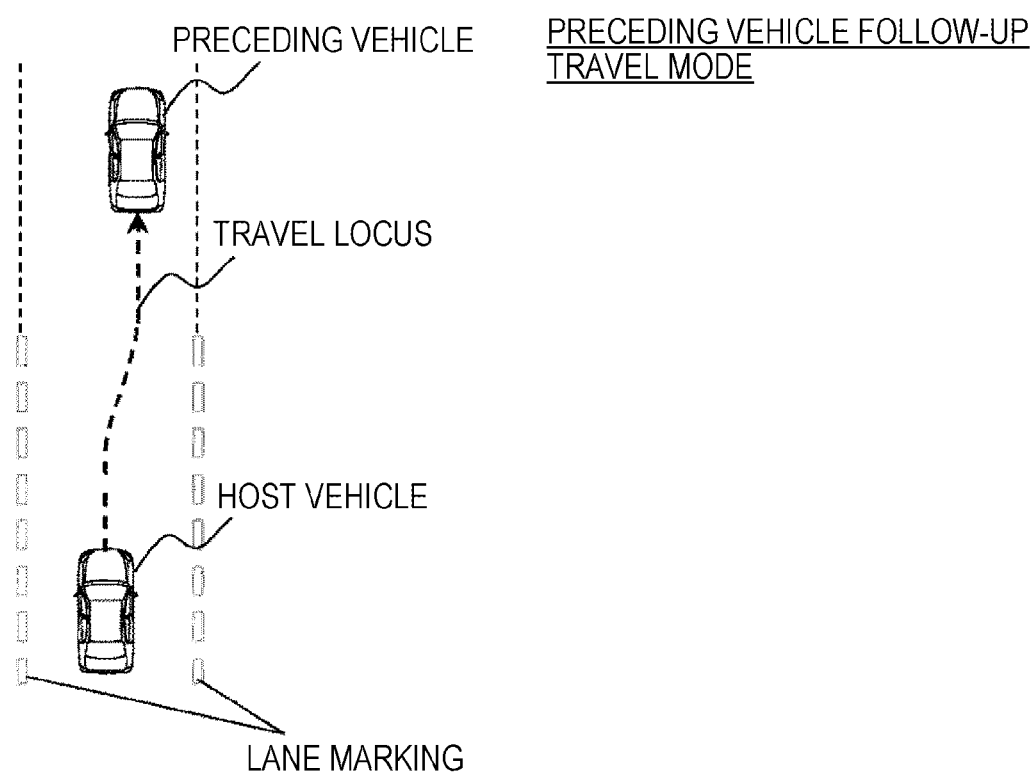
Figure 11:
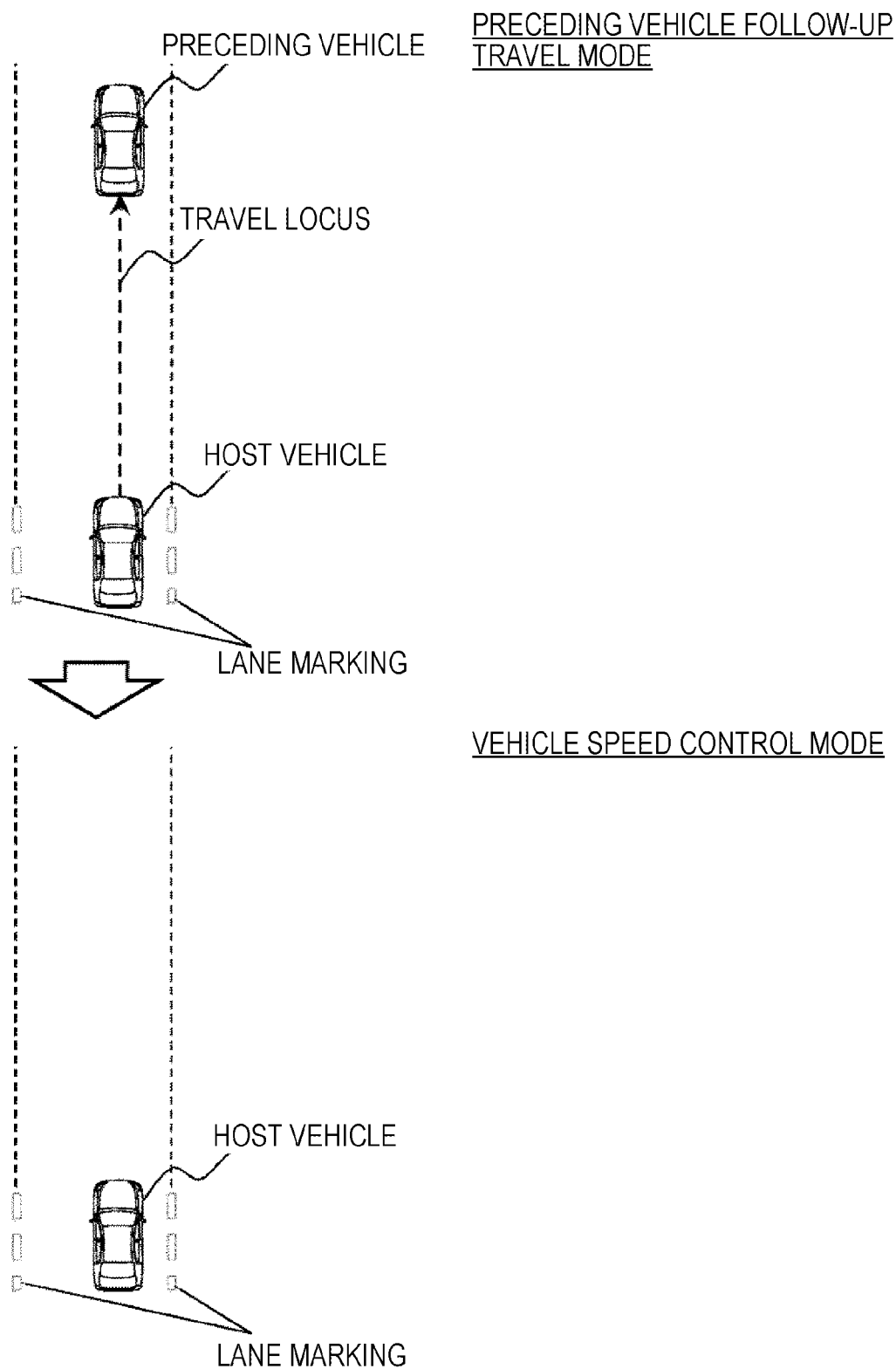
FIG. 11 is a diagram describing Example 1 of the embodiment of the present invention.
Figure 12:
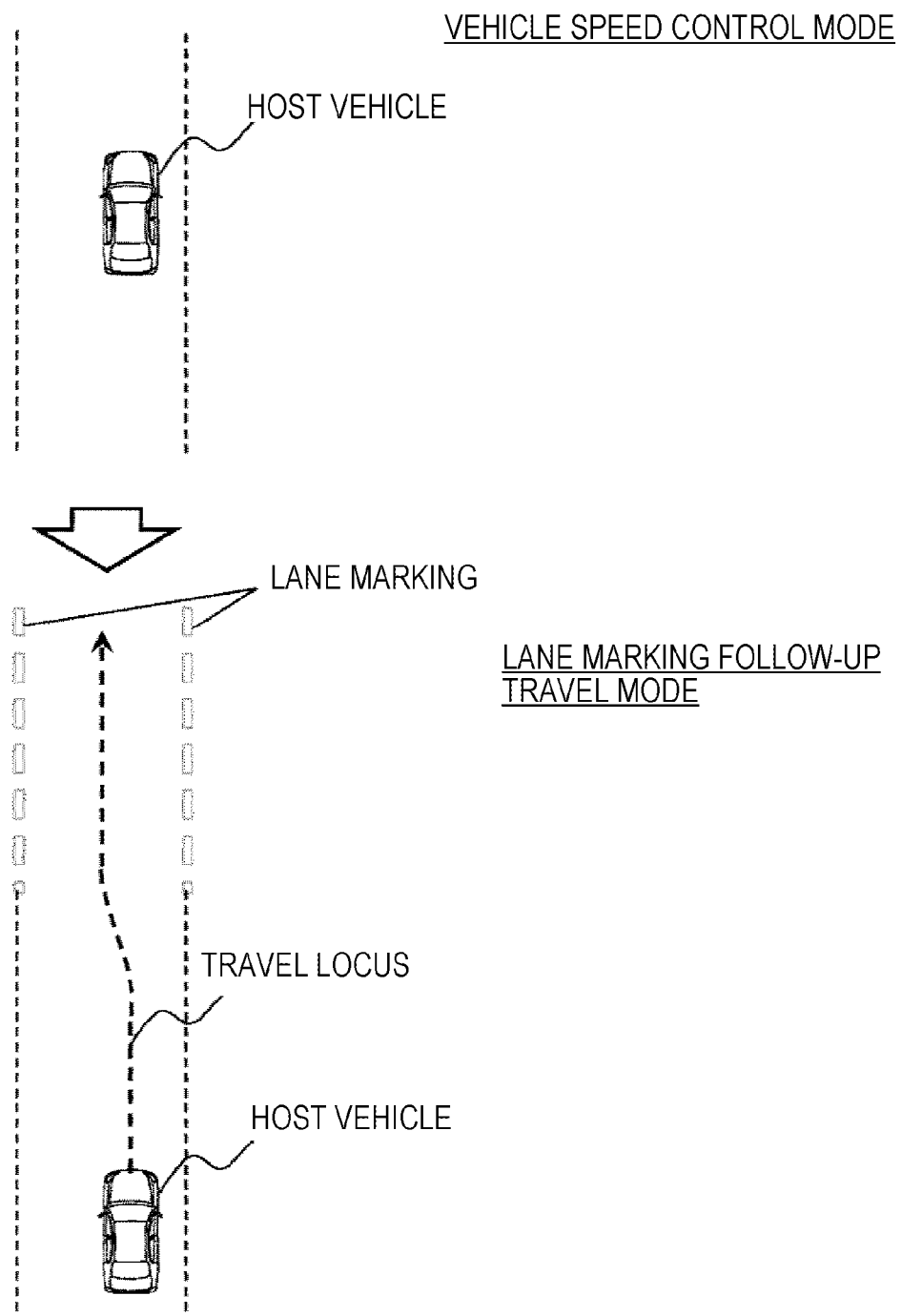
FIG. 12 is a diagram describing Example 1 of the embodiment of the present invention.

FIGS. 10, 11, and 12 illustrate an example of a travel scene in the present embodiment. First, when the lane marking control permission determination is ON in the step S301, it is determined in the step S307 that follow-up control with respect to lane marking is possible, and in the step S308, the lane marking follow-up control is performed by setting the control target to the lane marking as illustrated in an upper part of FIG. 10.

If lane marking information cannot be acquired, the lane marking control permission determination is set to OFF in the step S301, and it is determined in the step S307 that follow-up control with respect to the lane marking is impossible. At this time, if the preceding vehicle behavior stability determination is set to ON in the step S302 and the host vehicle behavior stability determination is set to ON in the step S303, it is determined in the step S309 that the control over the preceding vehicle is possible, and the preceding vehicle follow-up control is performed by setting the control target to the preceding vehicle in the step S310, as illustrated in a lower diagram of FIG. 10. Here, if traveling along the lane marking is difficult from a state in which the vehicle is traveling in the traveling lane in the lane marking follow-up travel mode, a process of switching to the preceding vehicle follow-up travel mode is performed when a vehicle satisfying the follow-up travel enabling condition exists in front of the host vehicle.

In the step S301, the lane marking control permission determination is set to OFF. Further, if the preceding vehicle behavior stability determination is set to OFF in the step S302 or the host vehicle behavior stability determination is set to OFF in the step S303, the vehicle speed control is performed by setting the control target to none in the step S311, as illustrated in a lower diagram of FIG. 11. Here, if traveling along the lane marking is difficult from a state in which the vehicle is traveling in the traveling lane in the lane marking follow-up travel mode, at least the process of continuing the vehicle speed control of the host vehicle is performed when a vehicle satisfying the follow-up travel enabling condition does not exist in front of the host vehicle.

For example, in the step S301, the lane marking control permission determination is set to OFF, and in the step S302, the preceding vehicle behavior stability determination is set to OFF, or in the step S303, the host vehicle behavior stability determination is set to OFF, and the travel mode is the vehicle speed control mode. Then, if the lane marking control permission determination is set to ON while repeating a loop of the flowchart of FIG. 4, the lane marking follow-up travel mode is entered and the lane marking follow-up control is performed, as illustrated in a lower diagram of FIG. 12. Here, if the lane marking or the preceding vehicle is detected while the vehicle speed control is continued, a process of restoring the lane marking follow-up travel mode or the preceding vehicle follow-up travel mode is performed.

In this manner, the vehicle control can be continued without canceling the travel control.

Example 2

The present embodiment is an example of a case where it is determined in the step S304 (traveling lane travel continuation impossible determination process) in Example 1 that the vehicle cannot continue traveling.

Figure 13:
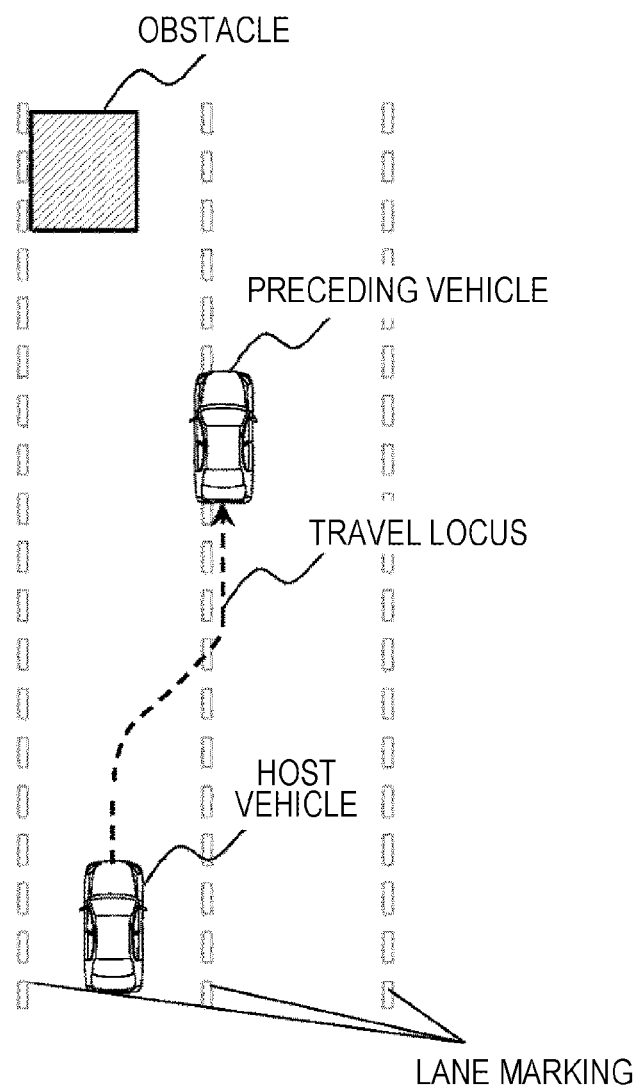
FIG. 13 is a diagram describing Example 2 of the embodiment of the present invention.

FIG. 13 illustrates an example of a travel scene in the present embodiment. When the preceding vehicle moves to an adjacent lane so as to avoid an obstacle on a traveling lane, the host vehicle transitions from a lane marking follow-up control travel mode to the preceding vehicle follow-up travel mode and moves to the adjacent lane along the travel locus of the preceding vehicle.

Figure 9:
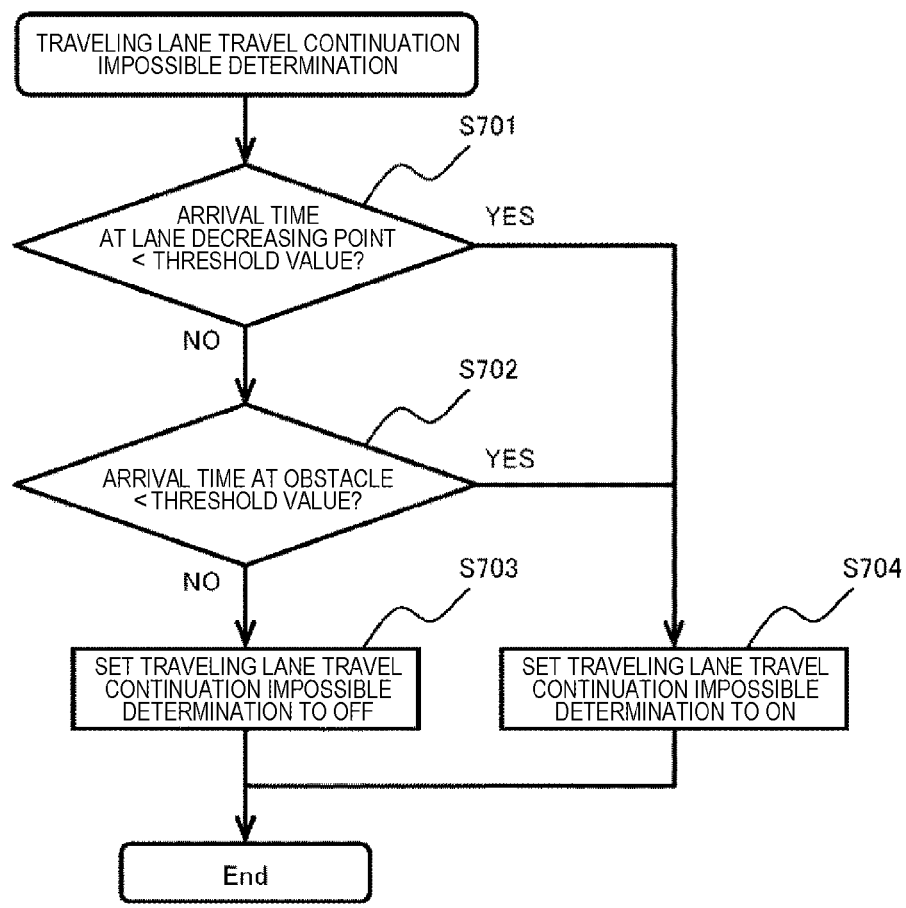
FIG. 9 is a processing flowchart of the embodiment of the present invention.

With reference to FIGS. 5 and 9, only the steps that are changed from Example 1 will be described below.

FIG. 9 is a flowchart of the step S304 (traveling lane travel continuation impossible determination process) of FIG. 5. The operation based on the flowchart is as follows.

Step S701: Based on the road information ahead of the host vehicle, a lane decreasing point of the traveling lane of the host vehicle due to a lane junction, a road construction, an accident vehicle, and the like, is acquired, and if an arrival time of the host vehicle at the lane decreasing point is smaller than a threshold value, the process proceeds to step S704. If NO, the process proceeds to step S702.

Step S702: Based on 3D object information in front of the host vehicle, a travel-impossible point due to the obstacle is acquired, and if the arrival time of the host vehicle at the travel-impossible point is smaller than the threshold value, the process proceeds to the step S704. If NO, the process proceeds to step S703.

Step S703: The traveling lane travel continuation impossible determination is set to OFF, and the process is ended.

Step S704: The traveling lane travel continuation impossible determination is set to ON, and the process is ended.

Step S307: If the lane marking control permission determination is set to ON and the traveling lane travel continuation impossible determination is set to OFF, the process proceeds to the step S308. Otherwise, the process proceeds to the step S309.

By the above operation, if the traveling lane travel continuation impossible determination is set to ON in the step S704, the process proceeds to the step S309 according to the determination in the step S307, and if the follow-up of the preceding vehicle is possible, the process transitions to the preceding vehicle follow-up travel mode so that traveling as illustrated in FIG. 13 is possible.

Example 3

The present embodiment is an example of a case where it is determined in the step S305 (other vehicle interruption determination process) in Example 2 that there is an interruption possibility.

Figure 14:
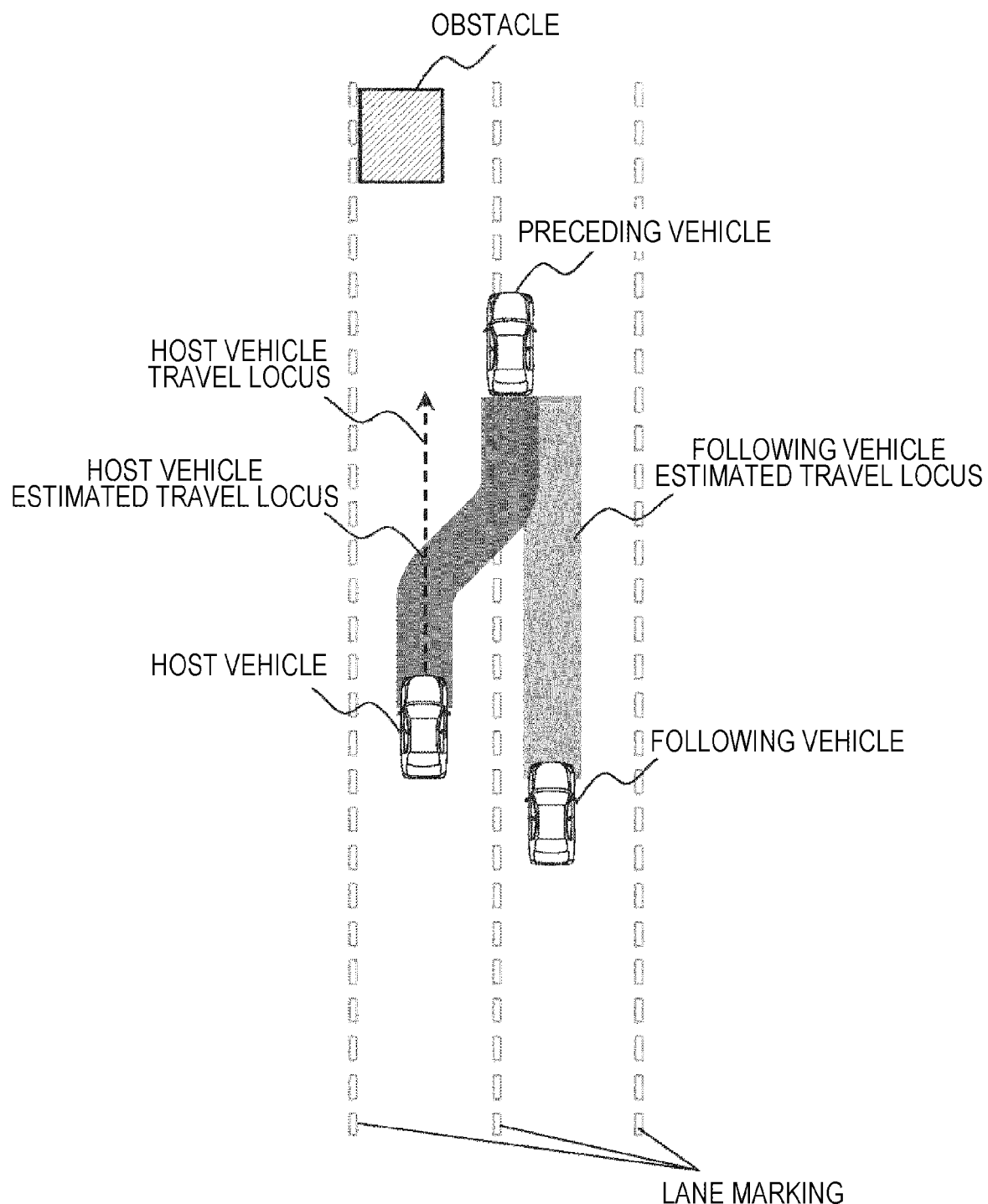
FIG. 14 is a diagram describing Example 3 of the embodiment of the present invention.

FIG. 14 illustrates an example of the travel scene in the present embodiment. Even when trying to avoid an obstacle by following the preceding vehicle, if it is determined that there is a high possibility that the following vehicle will come into the host vehicle travel locus, the transition to the preceding vehicle follow-up travel mode is suppressed.

Figure 16:
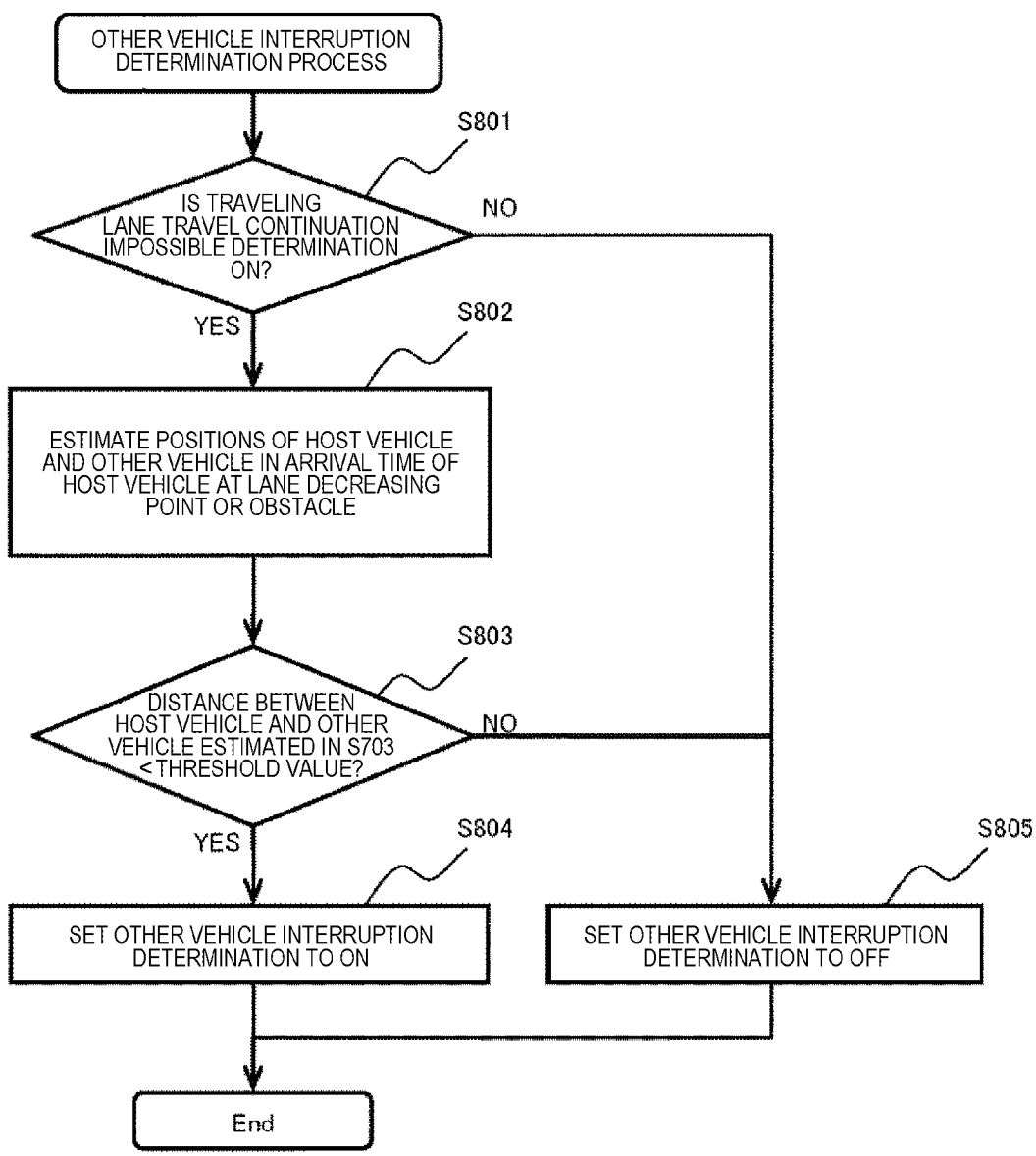
FIG. 16 is a diagram describing Example 3 of the embodiment of the present invention.

With reference to FIGS. 5, 9, and 16, only the steps that are changed from Example 2 will be described below.

FIG. 16 is a flowchart of the step S305 (other vehicle interruption determination process) of FIG. 5. The operation based on the flowchart is as follows.

Step S801: If it is determined in the step S304 of FIG. 5 that the traveling lane travel impossible determination is set to ON, the process proceeds to step S802. If the traveling lane travel impossible determination is set to OFF, the process proceeds to step S805.

Step S802: The position of the host vehicle and the position of the other vehicle in the arrival time of the host vehicle at the lane decreasing point calculated in the step S701 of FIG. 9, or the arrival time of the host vehicle at the travel-impossible point by the obstacle calculated in the step S702 of FIG. 9 is estimated.

Step S803: If there is at least one other vehicle whose distance between the position of the host vehicle and the position of the other vehicle estimated in the step S802 is smaller than the threshold value, the process proceeds to step S804. If the other vehicle does not exist, the process proceeds to the step S805.

Step S804: The other vehicle interruption determination is set to ON, and the process is ended.

Step S805: The other vehicle interruption determination is set to OFF, and the process is ended.

Step S309: If the preceding vehicle behavior stability determination is set to ON, the host vehicle behavior stability determination is set to ON, and the other vehicle interruption determination is set to OFF, the process proceeds to the step S310. Otherwise, the process proceeds to the step S311.

According to the above operation, when the other vehicle interruption determination is set to ON in the step S804, the process proceeds to the step S311 by the determination of the step S309 and transitions to the vehicle speed control mode. If it is determined that the possibility that the following vehicle is likely to enter the host vehicle travel locus is high as illustrated in FIG. 14, the transition to the preceding vehicle follow-up travel mode is suppressed and the transition to the vehicle speed control mode is possible.

Example 4

The present embodiment is an example of a case where it is determined in the step S306 (preceding vehicle follow-up possible section determination process) in Example 1 that the travel section is the preceding vehicle follow-up impossible section.

Figure 15:
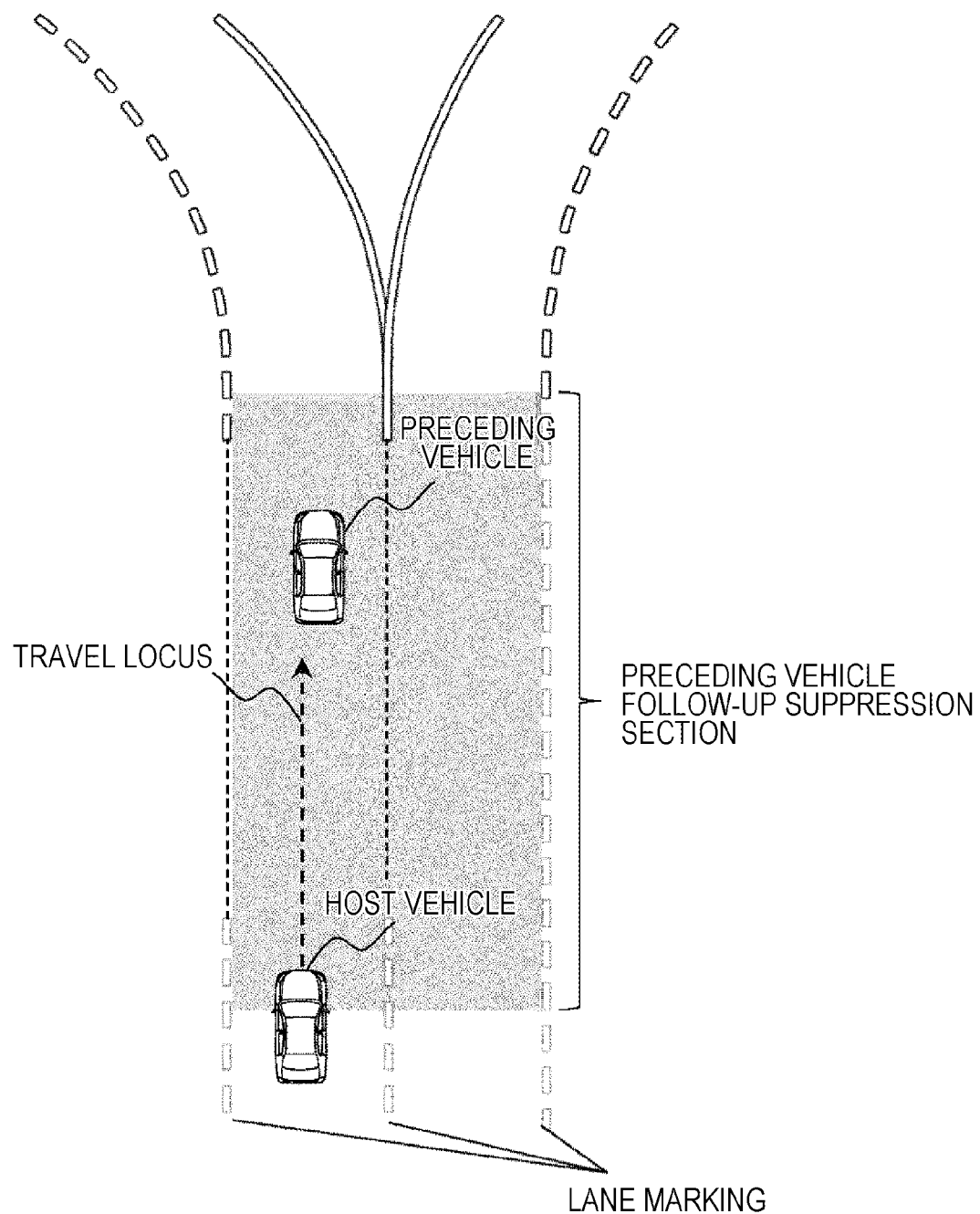
FIG. 15 is a diagram describing Example 4 of the embodiment of the present invention.

FIG. 15 illustrates an example of a travel scene in the present embodiment. When $x_1$ [m] before a branch of a road to $x_2$ [m] after the branch is set as the preceding vehicle follow-up suppression section and the host vehicle enters the preceding vehicle follow-up suppression section, the transition to the preceding vehicle follow-up travel mode is not performed even if the preceding vehicle behavior stability determination is set to ON and the host vehicle behavior stability determination is set to ON.

Figure 17:
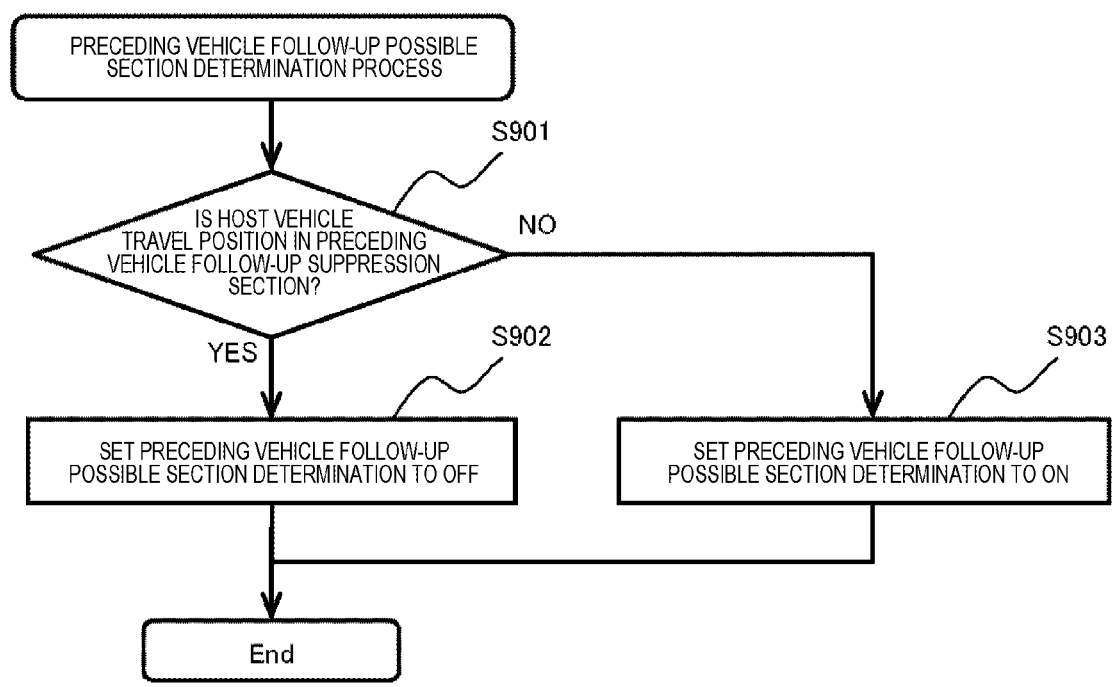
FIG. 17 is a diagram describing Example 4 of the embodiment of the present invention.

With reference to FIGS. 5 and 17, only the steps that are changed from Example 1 will be described below.

FIG. 17 is a flowchart of the step S306 (preceding vehicle follow-up possible section determination process) of FIG. 5. The operation based on the flowchart is as follows.

Step S901: It is determined whether the host vehicle is traveling in the preceding vehicle follow-up suppression section on the basis of the information of the preceding vehicle follow-up suppression section included in the surrounding road information output from the host vehicle surrounding information management unit 202. If the host vehicle is traveling within the preceding vehicle follow-up suppression section, the process proceeds to step S902. If the host vehicle is traveling out of the preceding vehicle follow-up suppression section, the process proceeds to step S903.

Step S902: The preceding vehicle follow-up possible section determination is set to OFF, and the process is ended.

Step S903: The preceding vehicle follow-up possible section determination is set to ON, and the process is ended.

Step S309: If the preceding vehicle behavior stability determination is set to ON, the host vehicle behavior stability determination is set to ON, and the preceding vehicle follow-up possible section determination is set to ON, the process proceeds to the step S310. Otherwise, the process proceeds to the step S311.

According to the above operation, if the preceding vehicle follow-up possible section determination is set to OFF in the step S902, the process proceeds to the step S311 by the determination in the step S309 and transitions to the vehicle speed control mode. As illustrated in FIG. 15, if the host vehicle enters the preceding vehicle follow-up suppression section, it is possible to shift to the vehicle speed control mode by suppressing the transition to the preceding vehicle follow-up travel mode.

If Example 3 and Example 4 are implemented at the same time, it is possible to simultaneously obtain the effects of Example 3 and Example 4 by setting the operation of the step S309 as follows.

Step S309: If the preceding vehicle behavior stability determination is set to ON, the host vehicle behavior stability determination is set to ON, the other vehicle interruption determination is set to OFF, and the preceding vehicle follow-up possible section determination is set to ON, the process proceeds to the step S310. Otherwise, the process proceeds to the step S311.

Although the embodiment of the present invention has been described in detail with reference to the drawings, the specific configuration is not limited to the embodiment. Even when there are design changes or the like without departing from the gist of the present invention, they fall within the present invention.

REFERENCE SIGNS LIST 101 rear radar
102 front camera
103 omnidirectional camera
104 map information
105 locator
106 steering angle sensor
107 vehicle speed sensor
201 travel control device
202 host vehicle surrounding information management unit
203 vehicle control unit
301 motion manager device
401 drive actuator
402 brake actuator
403 steering actuator

The invention claimed is:

1. A travel control device comprising:
a first mode which causes a host vehicle to travel according to a control target set on the basis of an object outside the host vehicle; and
a second mode which causes the host vehicle to travel according to a control target set irrespective of an object outside the host vehicle,
wherein the control target of the first mode is set on the basis of a lane marking that defines a traveling lane of the host vehicle or a preceding vehicle traveling ahead of the host vehicle,
wherein, responsive to determining that it is possible to set the control target on the basis of the preceding vehicle traveling ahead of the host vehicle during traveling in the second mode, a travel mode of the host vehicle is shifted from the second mode to the first mode, and
wherein setting the control target on the basis of the preceding vehicle traveling ahead of the host vehicle comprises a determination that, within a predetermined period of time,
an integral value of an absolute value of a longitudinal relative speed of the preceding vehicle is smaller than a first threshold value, and
an integral value of an absolute value of a lateral relative speed of the preceding vehicle is smaller than a second threshold value.

2. The travel control device according to claim 1, wherein responsive to determining that it is not possible to set the control target on the basis of the object outside the host vehicle during traveling in the first mode, the travel mode is shifted to the second mode.

3. The travel control device according to claim 1, wherein the first mode comprises:
a lane marking follow-up travel mode which performs traveling along lane markings that define a traveling lane of the host vehicle; and
a preceding vehicle follow-up travel mode which causes the host vehicle to travel following the preceding vehicle traveling ahead of the host vehicle.

4. The travel control device according to claim 1, wherein the second mode comprises a vehicle speed control mode in which a vehicle speed of the host vehicle is a control target.

5. The travel control device according to claim 3, wherein responsive to determining that traveling along the lane marking is not possible in a state in which the host vehicle is traveling in the traveling lane in the lane marking follow-up travel mode, the travel mode is switched to the preceding vehicle follow-up travel mode when a vehicle satisfying a follow-up travel enabling condition exists in front of the host vehicle.

6. The travel control device according to claim 3, wherein responsive to determining that traveling along the lane marking is not possible in a state in which the host vehicle is traveling in the traveling lane in the lane marking follow-up travel mode, at least a vehicle speed control of the host vehicle is continued when a vehicle satisfying the follow-up travel enabling condition does not exist in front of the host vehicle.

7. The travel control device according to claim 5, wherein a steering control and a vehicle speed control are performed in the lane marking follow-up travel mode and the preceding vehicle follow-up travel mode, and
the vehicle speed control is performed without performing a steering angle control when the vehicle satisfying the follow-up travel enabling condition does not exist in front of the host vehicle.

8. The travel control device according to claim 3, wherein when the lane marking or the preceding vehicle is detected while the vehicle speed control is continued, the lane marking follow-up travel mode or the preceding vehicle follow-up travel mode is restored.

9. The travel control device according to claim 5, wherein responsive to determining that there is a high possibility that a following vehicle will interrupt on a travel locus of the host vehicle, the switching to the preceding vehicle follow-up travel mode is stopped.

10. The travel control device according to claim 5, wherein responsive to determining that the host vehicle travels a preset preceding vehicle follow-up suppression section, the switching to the preceding vehicle follow-up travel mode is stopped.

* * * * *